Dec. 25, 1956  G. PETERSON  2,775,503
MULTIPLE TRACE RECORDER
Filed July 10, 1953  2 Sheets-Sheet 1

INVENTOR.
GLEN PETERSON
BY James Y. Cleveland
ATTORNEY

Dec. 25, 1956  G. PETERSON  2,775,503
MULTIPLE TRACE RECORDER
Filed July 10, 1953  2 Sheets-Sheet 2

*INVENTOR.*
GLEN PETERSON
BY
*James Y. Cleveland*
ATTORNEY

United States Patent Office 2,775,503
Patented Dec. 25, 1956

2,775,503

MULTIPLE TRACE RECORDER

Glen Peterson, Tulsa, Okla., assignor to Well Surveys, Incorporated, Tulsa, Okla., a corporation of Delaware Application July 10, 1953, Serial No. 367,302

4 Claims. (Cl. 346—109)

This invention relates to multiple trace recorders and particularly to means for distinguishing the various traces thereof.

In the recording of information it is frequently desirable to record several phenomena simultaneously. In the event that these phenomena are interrelated, it is often desirable to record them upon the same piece of recorder paper or film. When several phenomena are recorded upon the same chart paper it becomes necessary to identify particular phenomena with particular traces. In order to do this, it is necessary that one trace be physically distinguishable from any other.

In the prior art, traces have been distinguished by color; however, when traces of different colors crossed, the recorder ink tended to flow from one trace to the other, and recorder pens collected ink of other colors causing the colors to lose their distinctiveness. Further, color identification is not possible on black and white recorder film. In the prior art, traces have been identified by intermittently breaking the traces in a predetermined manner. Thus, each trace had blank spaces arranged according to a code which identified the trace. These blank spaces were made by lifting the recording pen from the recorder chart in the case of a pen recorder or by removing the light source in the case of a photographic recorder. A difficulty with this scheme was that important details of character of the record might occur during the blank portion of the trace. The instant invention utilizes a code system of dots and dashes to identify traces without lifting the recorder pen from the paper or removing the light source. This is accomplished by broadening each trace intermittently in accordance with a predetermined code system. Thus, where a trace normally records phenomena with a fine trace, at predetermined intervals the trace is made sufficiently thicker that the trace appears to have a series of dots and dashes superimposed thereon; however, the thickening is not so great as to obscure the phenomena being recorded. In accordance with one form of the instant invention a modulating 60-cycle signal is superimposed upon the signal being detected at predetermined intervals.

Therefore, the primary object of this invention is to provide a method and apparatus for distinguishing the traces of a multiple trace recorder. Another object of this invention is to provide a method and apparatus for distinguishing said traces without losing the details of character of the record. Other objects and advantages of the present invention will become apparent from the following detailed description, when considered with the accompanying drawings, in which.

Figure 1:
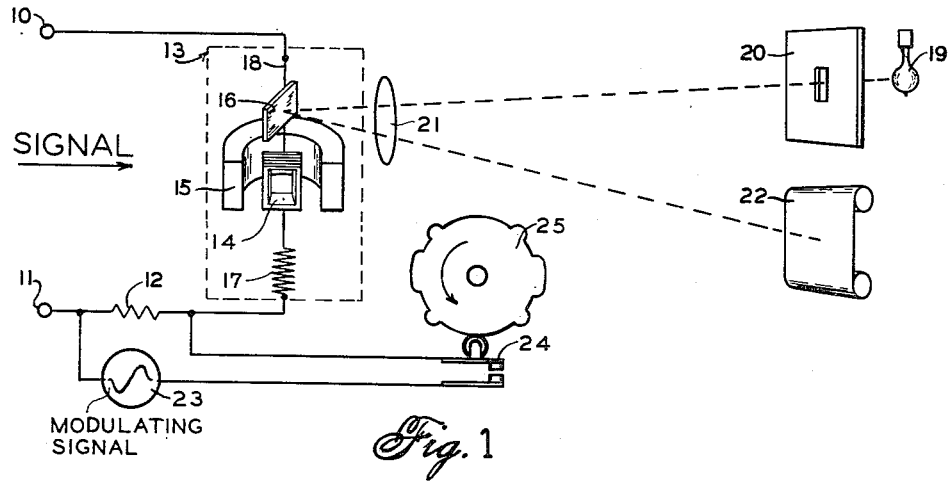
Figure 1 shows a recording galvanometer with means for identifying the trace produced.

In recording related information, it is desirable that the records be made simultaneously on a single piece of recording paper or film. This may be done by a multiple trace recorder wherein a number of independent galvanometers simultaneously make traces on the same recorder film. In Figure 1 there is illustrated an independent galvanometer system incorporating means for distinguishing the trace produced by the system from the trace produced by any other galvanometer system. A number of such galvanometer systems in cooperation with a camera produces a film record whereon each trace is identified by a code system.

The signal to be recorded is applied between terminals 10 and 11. The signal is applied through resistor 12 to galvanometer 13 which comprises galvanometer windings 14, magnet 15, mirror 16, torsion spring 17, and suspension 18. The signal to be recorded produces current flow through galvanometer windings 14 which sets up a magnetic field which reacts with the magnetic field of magnet 15. The resulting torque causes the galvanometer windings 14 to turn against a torsion spring 17 and suspension 18. The galvanometer windings therefore assume a position where the restoring torque of the spring 17 and suspension 18 is equal to the magnetic torque produced by the current through the windings. The position assumed is therefore indicative of the current through the windings produced by the signal to be recorded. Light from lamp 19 shines through a slit in mask 20 and lens 21 on mirror 16 which moves in fixed relation to galvanometer windings 14. The light is reflected from mirror 16 back through lens 21 upon film strip 22 which is caused to move in a conventional fashion according to time or some other variable. The focal length of lens 21 is such as to focus said slit upon film strip 22. By this means a trace is produced upon the film strip. If a number of galvanometer systems are used and different signals are applied to them a number of such systems may be used with the same film strip. A number of traces may be thereby applied simultaneously to the same film strip.

Figure 2:
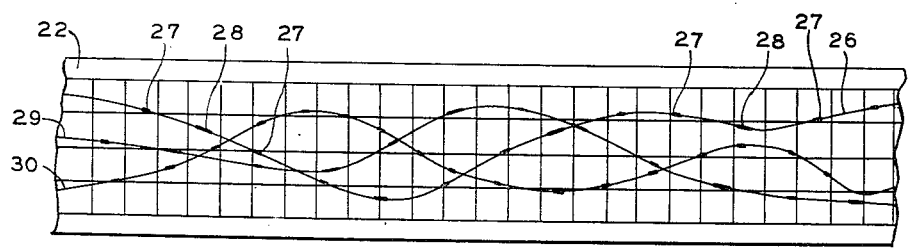
Figure 2 is a film record produced by the apparatus of this invention.

So far a conventional multi-trace recorder has been described. In order to distinguish the traces, a modulating signal is introduced into the galvanometer system across resistor 12 from alternating current source 23 which may conveniently be 60-cycle alternating current ordinarily available. This modulating signal is applied when switch 24 is closed by rotating cam 25. The configuration of cam 25 is such that switch 24 is opened and closed according to a predetermined code system. The result of the application of the modulating signal is the reproduction of the modulating signal on film strip 22. The magnitude of the modulating signal is made small relative to variations in the signal being recorded so that it does not obscure the recording of this signal on the film strip. The resultant trace will have a number of dots and dashes of modulating signal superimposed upon the signal being recorded. The traces of a multi-trace recorder according to the present invention are illustrated in Figure 2.

Trace 26 represents a trace drawn by the mechanism of Figure 1. Dots 27 and dashes 28 represent the effect of modulating signal introduced when switch 24 is closed by cam 25. Configuration of the cam determines the number, spacing and length of the dots and dashes. Traces 29 and 30 represent traces produced by similar mechanisms. These traces have different distinguishing dots and dashes thereby traces 26, 29 and 30 may be readily identified. The size of the modulating signal is adjusted to produce a wave on the film 22 of amplitude only slightly greater than the thickness of the normal trace, thus the identifying dots and dashes distinguish the traces without obscuring the excursions of the normal trace.

Figure 3:
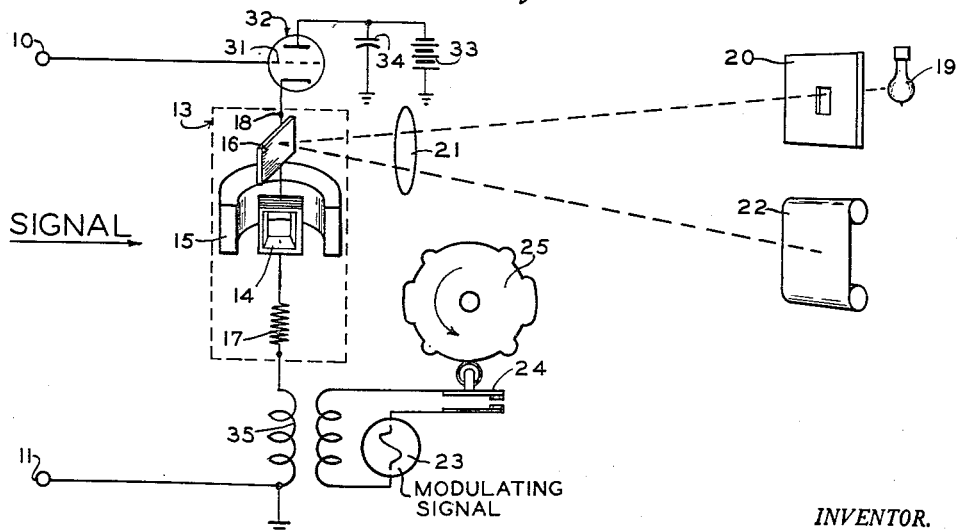
Figure 3 shows a modified means for identifying the recorder trace.

In Figure 3 there is illustrated another method of applying the modulating voltage. The signal to be recorded is applied between grid 31 of triode 32 and ground. The triode is connected as a cathode follower with the galvanometer 13 in the cathode circuit. The power is supplied from battery 33 across condenser 34. The modulating voltage from source 23 is coupled to the galvanometer circuit through transformer 35. Except for the means for applying the signal to be recorded and the means for coupling the modulating signal in such manner as to substantially avoid interaction between the two, the mechanism of Figure 3 operates in the same fashion as the mechanism of Figure 1. Particularly, is such decoupling means desirable where a plurality of galvanometers are connected to the same signal source as mentioned below.

Figure 4:
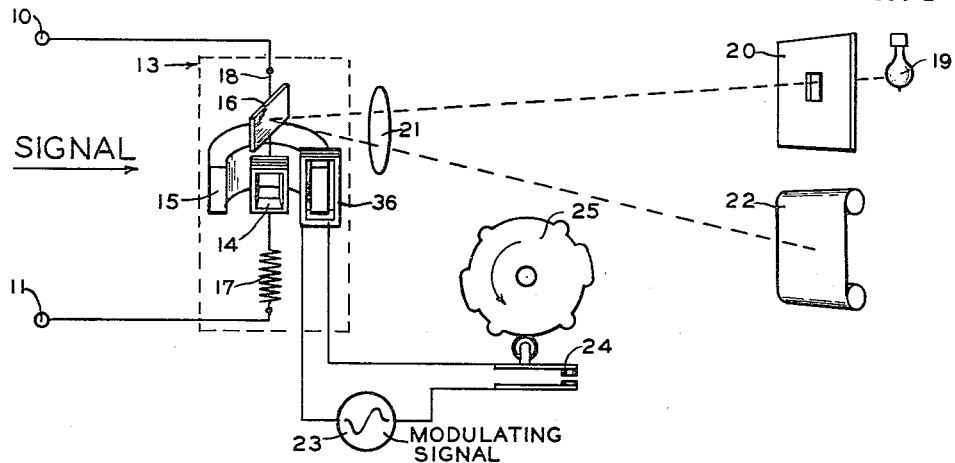
Figure 4 shows another means for identifying the recorder trace.

In Figure 4 the modulating signal is coupled to the galvanometer by a coil 36 about magnet 16; otherwise the mechanism of Figure 4 operates in the same fashion as the mechanism of Figure 1.

Figure 5:
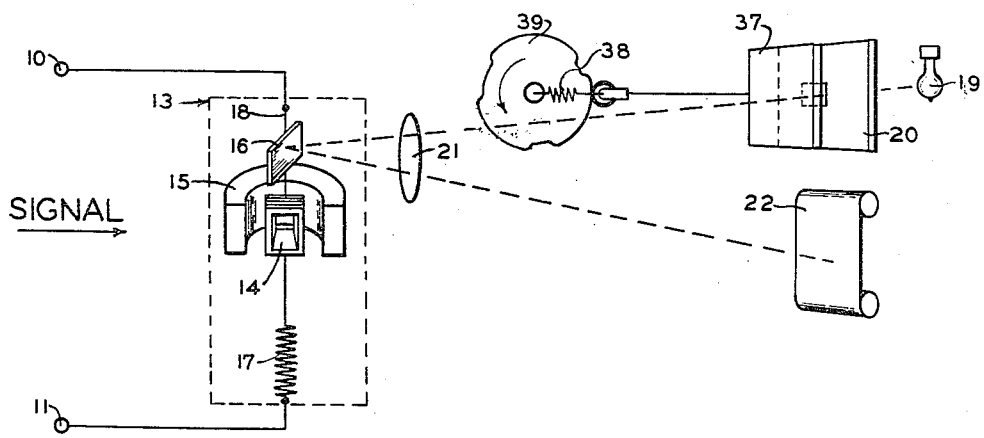
Figure 5 illustrates still another means for identifying the recorder trace.

In Figure 5 there is illustrated another means for placing identifying marks on a trace. In this case the size of the light spot is varied. Plate 37 partially covers the slit in mask 20. Spring 38 urges plate 37 in a direction to uncover said slit. The configuration of cam 39 permits spring 38 to draw plate 37 from said slit according to a predetermined code system. This widens the trace drawn on film strip 22 in accordance with said code.

Although this invention has been described using a photographic recorder the described invention is equally applicable to a pen recorder, except for the species shown in Figure 5, providing the pen can follow the modulating current at the modulating frequency.

This invention is also useful in identifying traces where a plurality of galvanometers of different sensitivities or ranges are used to record the same phenomena.

It is to be understood that this invention is not to be limited to the specific modifications described but is to be limited only by the following claims:

I claim:

1. In a multiple-trace recorder wherein signals to be recorded are independently applied to a plurality of galvanometers and an independent trace is produced by each of said galvanometers, apparatus for intermittently broadening the trace produced by each galvanometer while retaining the character of said trace, said apparatus comprising a source of alternating current, means for applying said alternating current to said galvanometer while retaining the character of said trace, means for interrupting the application of said alternating current, and means for operating said interrupting means in accordance with a code whereby the trace is identified by said code.

2. In a multiple-trace recorder wherein signals to be recorded are independently applied to a plurality of galvanometers and an independent trace is produced by each of said galvanometers, apparatus for intermittently broadening the trace produced by each galvanometer while retaining the character of said trace, said apparatus comprising a source of alternating current, means for applying said alternating current to said galvanometer while retaining the character of said trace, switch means for interrupting the application of said alternating current, and cam means for operating said switch means, the configuration of said cam means being such as to operate said switch means in accordance with a code whereby said trace is identified by said code.

3. In a multiple-trace recorder wherein signals to be recorded are separately applied to a plurality of galvanometers and a trace is produced by each of said galvanometers, apparatus for intermittently broadening the trace produced by at least one galvanometer while retaining the character of said trace, said apparatus comprising a source of alternating current, a resistor in series with the current coil of said galvanometer, and means for applying said alternating current across said resistor in accordance with a code while retaining the character of said trace whereby said trace is identified by said code without materially altering the character of said trace.

4. In a multiple-trace recorder wherein signals to be recorded are independently applied to a plurality of galvanometers and an independent trace is produced by each of said galvanometers, apparatus for intermittently broadening the trace produced by at least one galvanometer while retaining the character of said trace, said apparatus comprising a source of alternating current, impedance in series with the current coil of said galvanometer, means for applying said alternating current across said impedance while retaining the character of said trace, switch means for interrupting the application of said alternating current, and cam means for operating said interrupting means in accordance with a code whereby the trace is identified by said code while retaining the character of said trace.

References Cited in the file of this patent

UNITED STATES PATENTS

| | | |
|---|---|---|
| 2,489,253 | Andre | Nov. 29, 1949 |
| 2,635,034 | Haviland | Apr. 14, 1953 |
| 2,645,552 | Stevinson | July 14, 1953 |
| 2,675,540 | Schultheis | Apr. 13, 1954 |
| 2,676,316 | Wallace | Apr. 20, 1954 |

OTHER REFERENCES

Television Video Handbook, William F. Boyce, publisher, pages 809–811.